United States Patent
Afifi et al.

(10) Patent No.: US 11,044,450 B2
(45) Date of Patent: Jun. 22, 2021

(54) IMAGE WHITE BALANCING

(71) Applicants: Adobe Inc., San Jose, CA (US); York University, Ontario (CA)

(72) Inventors: Mahmoud Afifi, Toronto (CA); Michael Brown, Toronto (CA); Brian Price, Pleasant Grove, UT (US); Scott Cohen, Sunnyvale, CA (US)

(73) Assignees: Adobe Inc., San Jose, CA (US); York University, Ontario (CA)

( * ) Notice: Subject to any disclaimer, the term of this patent is extended or adjusted under 35 U.S.C. 154(b) by 97 days.

(21) Appl. No.: 16/435,371

(22) Filed: Jun. 7, 2019

(65) Prior Publication Data

US 2020/0389635 A1    Dec. 10, 2020

(51) Int. Cl.
*H04N 9/73*    (2006.01)
*G06K 9/62*    (2006.01)
*G06T 5/40*    (2006.01)

(52) U.S. Cl.
CPC ............ *H04N 9/735* (2013.01); *G06K 9/6212* (2013.01); *G06K 9/6215* (2013.01); *G06T 5/40* (2013.01)

(58) Field of Classification Search
CPC ....... G06T 5/40; G06K 9/6212; G06K 9/6215
See application file for complete search history.

(56) References Cited

U.S. PATENT DOCUMENTS

| | | | | |
|---|---|---|---|---|
| 8,909,563 | B1* | 12/2014 | Jing | G06K 9/6267 706/12 |
| 2003/0020826 | A1* | 1/2003 | Kehtarnavaz | H04N 9/735 348/362 |
| 2013/0315479 | A1* | 11/2013 | Paris | G06K 9/6256 382/159 |

(Continued)

OTHER PUBLICATIONS

Li, B., Xu, D. and Lang, C. (2009), Colour constancy based on texture similarity for natural images. Coloration Technology, 125: 328-333. doi: 10.1111/j.1478-4408.2009.00214.x (Year: 2009).*

(Continued)

*Primary Examiner* — Utpal D Shah
(74) *Attorney, Agent, or Firm* — Kilpatrick Townsend & Stockton LLP

(57) ABSTRACT

Techniques are described for white balancing an input image by determining a color transformation for the input image based on color transformations that have been computed for training images whose color characteristics are similar to those of the input image. Techniques are also described for generating a training dataset comprising color information for a plurality of training images and color transformation information for the plurality of training images. The color information in the training dataset is searched to identify a subset of training images that are most similar in color to the input image. The color transformation for the input image is then computed by combining color transformation information for the identified training images. The contribution of (Continued)

the color transformation information for any given training image to the combination can be weighted based on the degree of color similarity between the input image and the training image.

18 Claims, 11 Drawing Sheets
(3 of 11 Drawing Sheet(s) Filed in Color)

(56) References Cited

U.S. PATENT DOCUMENTS

| | | | | |
|---|---|---|---|---|
| 2016/0104284 | A1* | 4/2016 | Maguire | H04N 5/2257 348/187 |
| 2016/0284095 | A1* | 9/2016 | Chalom | G06K 9/627 |
| 2017/0237961 | A1* | 8/2017 | Barron | H04N 1/6086 348/223.1 |
| 2018/0097992 | A1* | 4/2018 | Douady-Pleven | H04N 9/646 |
| 2018/0260665 | A1* | 9/2018 | Zhang | G06K 9/6276 |
| 2018/0373959 | A1* | 12/2018 | Rhoads | G06K 9/00208 |

OTHER PUBLICATIONS

A. Gijsenij and T. Gevers, "Color Constancy Using Natural Image Statistics and Scene Semantics," in IEEE Transactions on Pattern Analysis and Machine Intelligence, vol. 33, No. 4, pp. 687-698, Apr. 2011, doi: 10.1109/TPAMI.2010.93. (Year: 2010).*

Meng Wu, Jun Sun, Jun Zhou, and Gengjian Xue, "Color constancy based on texture pyramid matching and regularized local regression," J. Opt. Soc. Am. A 27, 2097-2105 (2010) (Year: 2010).*

Adjust Color Balance of RGB Image with Chromatic Adaptation, MATLAB Chromadapt, Mathworks, Available online at: https://www.mathworks.com/help/images/ref/chromadapt.html, 1994-2019, 5 pages.

Andersen et al., Weighted Constrained Hue-Plane Preserving Camera Characterization, IEEE Transactions on Image Processing, vol. 25, No. 9, Sep. 2016, 3 pp.

Anderson et al., Proposal for a Standard Default Color Space for the Internet-sRGB, In Color and Imaging Conference, 1996, pp. 238-245.

Arandjelovic et al., Three Things Everyone Should Know to Improve Object Retrieval, IEEE Conference on Computer Vision and Pattern Recognition, Jun. 16-21, 2012, 8 pages.

Aytekin et al., A Data Set for Camera-Independent Color Constancy, IEEE Transactions on Image Processing, vol. 27, No. 2, Feb. 2018, 3 pp.

Barron, Convolutional Color Constancy, Computer Vision and Pattern Recognition, Available online at: https://arxiv.org/pdf/1507.00410.pdf, Sep. 18, 2015, 9 pages.

Barron et al., Fast Fourier Color Constancy, Computer Vision and Pattern Recognition, 2017, 9 pages.

Berns et al., Colorimetric Characterization of a Desktop Drum Scanner Using a Spectral Model, Journal of Electronic Imaging, vol. 4, No. 4, Oct. 1995, pp. 360-372.

Bianco et al., Adaptive color constancy using faces, IEEE Transactions on Pattern Analysis and Machine Intelligence, vol. 36, No. 8, Jan. 6, 2014, 2 pp.

Brainard et al., Analysis of the Retinex Theory of Color Vision, Journal of the Optical Society of America A, vol. 3, No. 10, Oct. 1986, pp. 1651-1661.

Buchsbaum, A Spatial Processor Model for Object Colour Perception, Journal of the Franklin Institute, vol. 310, No. 1, Jul. 1980, 3 pp.

Bychkovsky et al., Learning Photographic Global Tonal Adjustment with a Database of Input/output Image Pairs, IEEE Computer Vision and Pattern Recognition, Jun. 2011, pp. 97-104.

Chakrabarti et al., Modeling Radiometric Uncertainty for Vision with Tone-mapped Color Images, IEEE Transactions on Pattern Analysis and Machine Intelligence, vol. 36, No. 11, Apr. 9, 2014, pp. 2185-2198.

Cheng et al., Beyond White: Ground Truth Colors for Color Constancy Correction, IEEE International Conference on Computer Vision (ICCV), Dec. 7-13, 2015.

Cheng et al., Illuminant Estimation for Color Constancy: Why Spatial-domain Methods Work and the Role of the Color Distribution, Journal of the Optical Society of America A, vol. 31, No. 5, Mar. 22, 2014, pp. 1049-1058.

Dayley et al., Adobe Photoshop CS6 Bible, John Wiley & Sons, 2012, 2 pp.

Debevec et al., Recovering High Dynamic Range Radiance Maps from Photographs, SIGGRAPH '97 Proceedings of the 24th annual conference on Computer graphics and interactive techniques, 1997, 10 pages.

Drew et al., Natural Metamers, CVGIP: Image Understanding, vol. 56, No. 2, Sep. 1992, 23 pp.

Ebner, Color Constancy, John Wiley & Sons, vol. 6, 2007, 1 page.

Fairchild, Color Appearance Models, John Wiley & Sons, 2013, 409 pages.

Finlayson et al., Color Correction Using Root-polynomial Regression, IEEE Transactions on Image Processing, vol. 24, No. 5, May 2015, pp. 1460-1470.

Finlayson et al., Color Homography: Theory and Applications, IEEE Transactions on Pattern Analysis and Machine Intelligence, vol. 14, No. 8, Aug. 2015, 14 pages.

Finlayson et al., Shades of Gray and Colour Constancy, In Color and Imaging Conference, 2004, pp. 37-41.

Gehler et al., Bayesian Color Constancy Revisited, IEEE Conference on Computer Vision and Pattern Recognition, Jun. 23-28, 2008, 8 pages.

Gijsenij et al., Computational Color Constancy: Survey and Experiments, IEEE Transactions on Image Processing, vol. 20, No. 9, Sep. 2011, pp. 2475-2489.

Gijsenij et al., Improving Color Constancy by Photometric Edge Weighting, IEEE Transactions on Pattern Analysis and Machine Intelligence, vol. 34, No. 5, May 2012, pp. 918-929.

Grossberg et al., What is the Space of Camera Response Functions?, IEEE Computer Society Conference on Computer Vision and Pattern Recognition, Jun. 18-20, 2003, 8 pages.

Hong et al., A Study of Digital Camera Colorimetric Characterization Based on Polynomial Modelling, Color Research & Application, vol. 26, No. 1, 2001, pp. 76-84.

Hu et al., FC4: Fully Convolutional Color Constancy with Confidence-Weighted Pooling, IEEE Conference on Computer Vision and Pattern Recognition (CVPR), Jul. 21-26, 2017, pp. 4085-4094.

Karaimer et al., A Software Platform for Manipulating the Camera Imaging Pipeline, European Conference on Computer Vision, Sep. 17, 2016, 1 page.

Karaimer et al., Improving Color Reproduction Accuracy on Cameras, IEEE/CVF Conference on Computer Vision and Pattern Recognition (CVPR), vol. 1, Jun. 2018, pp. 6440-6449.

Kim et al., A New in-camera Imaging Model for Color Computer Vision and its Application, IEEE Transactions on Pattern Analysis and Machine Intelligence, vol. 34, No. 12, Feb. 27, 2012, pp. 2289-2302.

Kim et al., Robust Radiometric Calibration and Vignetting Correction, IEEE Transactions on Pattern Analysis and Machine Intelligence, vol. 30, No. 4, May 2008, pp. 562-576.

Lam, Combining Gray World and Retinex Theory for Automatic White Balance in Digital Photography, In International Symposium on Consumer Electronics, 2005, pp. 134-139.

Lam, Metamerism and Colour Constancy, Ph.D. Thesis, University of Bradford, 1985, 7 pp.

Lin et al., Determining the Radiometric Response Function from a Single Grayscale Image, IEEE Computer Society Conference on Computer Vision and Pattern Recognition (CVPR'05), Jun. 20-25, 2005, 8 pages.

Lin et al., Radiometric Calibration from a Single Image, Proceedings / CVPR, IEEE Computer Society Conference on Computer Vision and Pattern Recognition, Jul. 2004, 8 pages.

Lin et al., Revisiting Radiometric Calibration for Color Computer Vision, International Conference on Computer Vision, Nov. 6-13, 2011, 3 pp.

(56) References Cited

OTHER PUBLICATIONS

Maaten et al., Visualizing Data using t-SNE, Journal of Machine Learning Research, vol. 9, Nov. 2008, pp. 2579-2605.
Moller, A Scaled Conjugate Gradient Algorithm for Fast Supervised Learning, Neural Networks, vol. 6, No. 4, 1993, pp. 525-533.
Nguyen et al., RAW Image Reconstruction Using a Self-Contained sRGB-JPEG Image with Only 64 KB Overhead, IEEE Conference on Computer Vision and Pattern Recognition (CVPR), Jun. 27-30, 2016, pp. 1655-1663.
Oh et al., Approaching the Computational Color Constancy as a Classification Problem Through Deep Learning, Pattern Recognition, vol. 61, Aug. 30, 2016, pp. 405-416.
Pollard, A User's Guide to Measure Theoretic Probability, Cambridge University Press, vol. 8, 2002.
Sharma, Digital Color Imaging Handbook, CRC Press, 2017, 9 pages.
Sharma et al., The Ciede2000 Color-Difference Formula: Implementation Notes, Supplementary Test Data, and Mathematical Observations, Color Research & Application, vol. 30, No. 1, Feb. 1, 2005, pp. 21-30.
Stockman, Physiologically-Based Color Matching Functions, In Color and Imaging Conference, 2008, 8 pp.
Van De Weijer et al., Edge-Based Color Constancy, IEEE Transactions on Image Processing, vol. 16, No. 9, Sep. 2007, pp. 2207-2214.
Xiong et al., From Pixels to Physics: Probabilistic Color De-rendering, IEEE Conference on Computer Vision and Pattern Recognition, Jun. 16-21, 2012, 8 pages.

\* cited by examiner

IMAGE WHITE BALANCING

TECHNICAL FIELD

This disclosure relates generally to techniques for white balancing images. Specifically, the present disclosure describes techniques for determining, based on color transformations previously computed for training images, a color transformation for white balancing an input image.

BACKGROUND

Most images are captured under non-white illumination. For example, when capturing an image of a scene using a camera, unless the scene is under direct sunlight, the illuminating light (which comes from one or more light sources) is usually tinted a certain color. Even light that appears white to a human observing the scene may not be completely white as the human mind has a tendency to compensate for slight color imbalances in the scene, tricking the observer into believing that the scene is under white light when, in fact, the scene is not. An image sensor capturing such a scene would produce an image that is incorrectly white balanced, e.g., tinted the same color as the illumination. To compensate for this, most cameras use an image processing pipeline that includes a white balancing step. In-camera white balancing involves the processor of the camera making a best-effort attempt at guessing what the color of the light illuminating the scene is and then adjusting the colors of the sensor image, based on the determined color of the illumination, to make the output image appear as if it had been captured under white light. Oftentimes, the camera guesses incorrectly. For example, a camera may not be able to distinguish between a white background illuminated by yellow light and a yellow background illuminated by white light. Consequently, the output image of the camera often needs to be further white-balanced, for example, using image editing software.

In addition to white balancing, camera image processing pipelines include various steps that are supposed to produce an output image similar to what would have been observed by a human at the scene. For example, because camera sensors generally have a linear response to light intensity, whereas the human eye does not, most camera pipelines apply a tone curve that simulates the response of the human eye. In addition to tone curves, camera pipelines typically include general color manipulation and hue or saturation manipulation steps. Tone curve, general color manipulation, and hue or saturation manipulation are each examples of nonlinear color manipulations that are usually performed after in-camera white balancing. Thus, the output image of the camera is an image that has been nonlinearly color transformed. This is problematic because conventional white balance techniques performed on images that were previously subjected to a camera pipeline will apply a linear color transformation, which is mathematically incorrect since the images were nonlinearly transformed. The linear color transformation is determined based on the color of the scene illuminant, which is either manually specified by a user or estimated by image editing software. However, even with knowledge of what the actual color of the illumination was, conventional post-capture white balancing techniques cannot adequately take into account the nonlinear color transformations that have already been applied. Therefore, both in-camera white balancing and post-capture white balancing are prone to producing incorrectly white balanced images.

SUMMARY

The present disclosure describes techniques for determining, based on color transformations previously computed for training images, a color transformation to white balancing an input image. In contrast to conventional techniques discussed above, the color transformation computed for the input image is a nonlinear transformation capable of correcting the white balance of any input image, even if the image was previously nonlinearly transformed. Thus, the embodiments described herein are applicable to camera images as well as images generated by sources other than cameras. Various embodiments are described herein, including methods, systems, non-transitory computer-readable storage media storing programs, code, or instructions executable by one or more processors, and the like.

In certain embodiments, a training dataset is created for a plurality of training images that are incorrectly white balanced. The training dataset includes information about color transformations that correct the white balance of the training images. Techniques are described herein for computing an appropriate color transformation for an input image based on color transformations for training images that have color characteristics (e.g., color distribution) that are similar to that of the input image.

In certain embodiments, the white balance functionality is provided by an image editing system. The image editing system references a training dataset to compute a color transformation for correcting the white balance of an input image. The image editing system applies the computed color transformation to generate an output image that is white balanced. That is, the output image appears as if it had been captured under white illumination.

In certain embodiments, the image editing system generates the training dataset based on one or more reference images (e.g., a raw image file that has not been subjected to any white balancing or other color manipulation). For each reference image, the image editing system generates a plurality of incorrectly white balanced training images (e.g., standard Red Green Blue (sRGB) images) and computes a color transformation for white balancing each training image. These color transformations can then be used to compute the appropriate color transformation for an input image to be white balanced.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawings will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
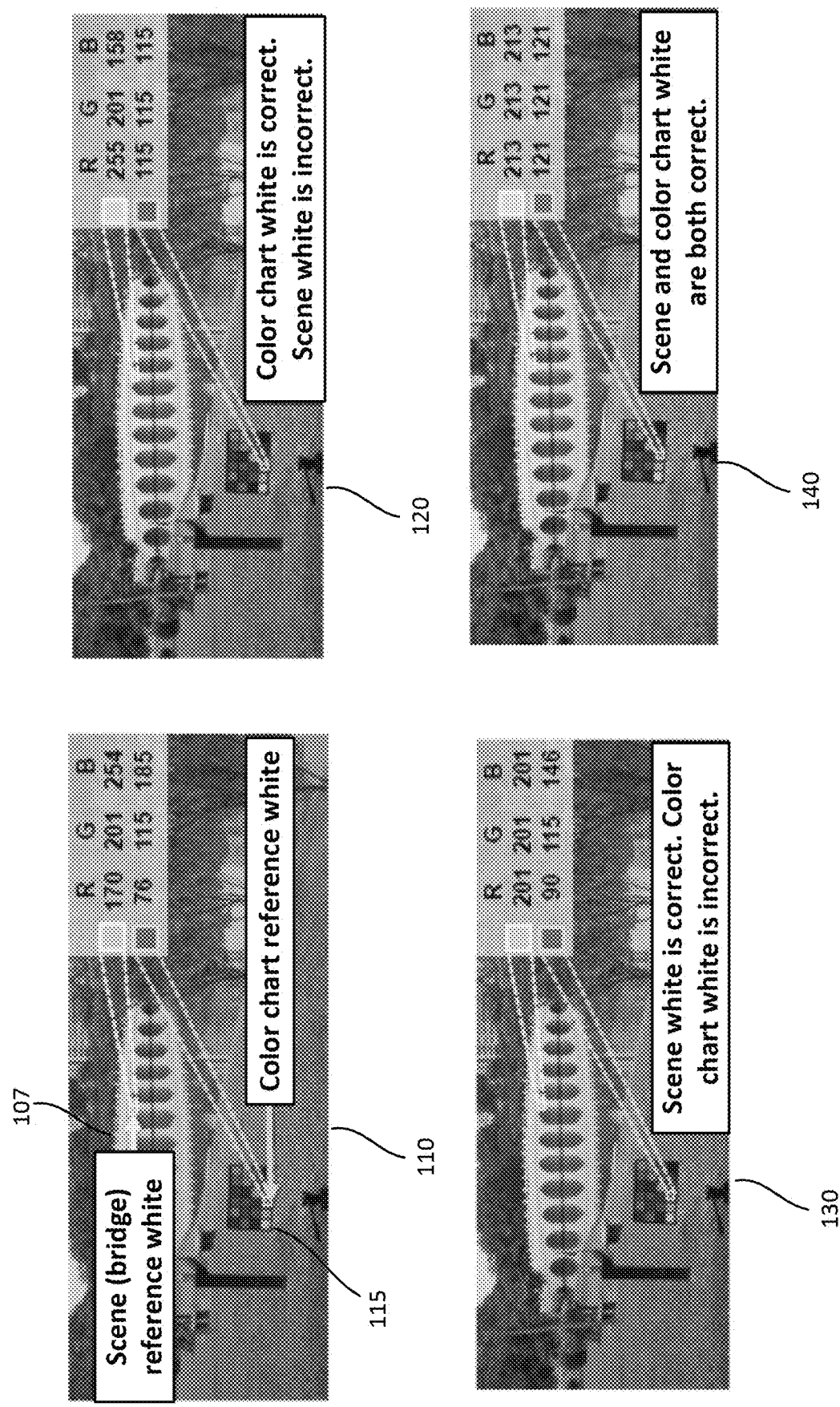
FIG. 1 depicts several versions of an image that are white balanced to varying degrees.

The present disclosure involves determining and applying a color transformation that corrects the white balance of an image to make the image appear as if it were captured under white illumination. As discussed above, conventional white balance techniques apply a linear color transformation that is mathematically incorrect when the image was previously subjected to a nonlinear color transformation, often producing output images that are incorrected white balanced. In contrast to the conventional techniques discussed above, the image processing and editing techniques disclosed herein enable white balancing to be performed correctly even for images that have been nonlinearly color transformed.

Embodiments described herein address the prior art limitations by providing improved white balance functionality. In certain embodiments, the improved white balance functionality is provided by an image editing system. The image editing system identifies training images that have color characteristics (e.g., color distribution) that are similar to that of the input image. Upon identifying these similar training images, the image editing system is able to compute an appropriate color transformation for the input image based on color transformations that were previously computed for the similar training images.

In certain embodiments, the image editing system generates a training dataset comprising color information representative of the color characteristics of a plurality of training images, and further comprising information about color transformations that provide optimal white balancing for the training images. The image editing system generates the training images from one or more reference images. Each training image is an incorrectly white balanced image that corresponds to what a reference image would look like after being processed based on various image rendering parameters including, for example, different camera models and different white balance or other camera settings that influence the color of the final output image. Thus, the training images include images representative of the output of an image processing pipeline that involves nonlinear color manipulation. The color transformations for the training images are computed based on ground truth images corresponding to correctly white balanced versions of the training images.

The following non-limiting example is provided to introduce certain embodiments. In this example, an image editing system receives an input image that is incorrectly white balanced. As used herein, the term "image" refers to a photo, a picture, a digital painting, a computer-generated graphic, or any other artifact that depicts visual perception. The image editing system employs a white balance subsystem that computes a color transformation for the input image. The white balance subsystem is configured to generate a histogram describing the color distribution of the input image, encode the contents of the histogram into a feature vector, and compare the feature vector of the input image to feature vectors of training images to identify, based on a distance metric computed using the feature vectors, a subset of training images that are closest to the input image with respect to color distribution.

In certain embodiments, the color transformation is implemented as a matrix multiplication with three operands: a correction matrix M, a kernel function $\Phi$ that projects the color values of each pixel in the input image into a larger dimensional color space (e.g., from a 3-dimensional sRGB color space to an 11-dimensional color space), and the input image. The white balance subsystem computes the correction matrix M for the input image as a weighted linear combination of correction matrices previously computed for the closest matching training images, where the weighting is based on the distance metric mentioned above. Although matrix multiplication is a linear operation, the color transformation is nonlinear because the values of the kernel function $\Phi$ are based at least in part on one or more nonlinear terms derived from pixel color values (e.g., $R*G$, $R^2$, $R*B$, $G^2$, etc.).

The white balance functionality described herein provides several improvements and benefits over conventional techniques. In contrast to conventional techniques discussed above, the white balance functionality enables images to be white balanced in the absence of information about the color of the illumination under which the images were generated (e.g., the illuminant in a scene captured by a camera). This enables users, even non-expert users, to perform white balancing quickly and easily and produce high-quality images, without having to manually specify the color of the illuminant or manually adjust the color balance (e.g., by dragging sliders, in a user interface provided by image editing software, to adjust the intensity values for each color). Additionally, the white balance functionality enables images to be white balanced in a manner than compensates for any nonlinear color transformations that were applied earlier. This is a result of using a nonlinear color transformation derived from color transformations for training images, where the training images reflect image processing involving nonlinear color manipulation.

Referring now to the drawings, FIG. 1 depicts several versions of an image that are white balanced to varying degrees. FIG. 1 includes an image 110 that has been incorrectly white balanced. The image 110 is a photo of a white bridge 107 against a green background. As discussed earlier, camera pipelines include nonlinear color manipulations that are usually performed after in-camera white balancing. The image 110 represents an sRGB image output by a camera after incorrect white balancing combined with nonlinear color manipulation. The image 110 includes a color rendition chart 115 with patches of various colors. Color rendition charts are sometimes used by photographers as a reference during post-capture white balancing. FIG. 1 shows incorrectly white balanced images 120 and 130 that result from using a patch in the color rendition chart 115 or a pixel of the bridge 107 as a white reference, respectively. The RGB values for the two white references are shown in image 110. In particular, if using the bridge 107 as the white reference, the RGB values are (170, 201, 254); if using the patch in the color rendition chart 115 as the white reference, the RGB values are (76, 115, 185).

Image 120 corresponds to a result of applying a diagonal 3×3 matrix to white balance the image 110 using the color rendition chart's patch as the white reference. The color of the scene illumination is computed based on the white reference. The values of the diagonal matrix are then computed to map the illumination's RGB color components to the achromatic line in the camera's raw-RGB color space. That is, the raw RGB values corresponding to the illumination are mapped onto a line representing the color white, where the R, G, and B values at any point along this line are all equal. Thus, when the image 110 is correctly white balanced, the RGB values for any given "white" pixel should at least be within a certain range of each other, if not equal. This is reflected in a ground truth image 140 in which the bridge has RGB values (213, 213, 213) and the color rendition chart patch has RGB values (121, 121, 121). In comparison to the ground truth image 140, the values of the color rendition chart patch in image 120 are correct. That is, the values of the color rendition chart patch (115, 115, 115) in image 120 are close to the corresponding values in the ground truth image 140 and equal to or within range of each other. However, the values of the bridge (255, 201, 158) are incorrect, i.e., far off from the corresponding values in the ground truth image 140 as well as far from each other.

Image 130 corresponds to a result of applying a diagonal 3×3 matrix to white balance the image 110 using the bridge 107 as the white reference. The diagonal matrix is computed in the same manner as discussed above with respect to the image 120. In comparison to the ground truth image 140, the values of the bridge in image 130 are correct, but the values of the color rendition chart patch are incorrect.

The images 120 and 130 therefore demonstrate that a linear color transformation performed, for example, using the 3×3 diagonal matrix described above, is insufficient to correctly white balance an image that has been subjected to nonlinear color manipulation, e.g., the image 110. In contrast, the white balance functionality described in connection with the example embodiments below enable images that have been subjected to nonlinear color manipulation to be correctly white balanced.

Figure 2:
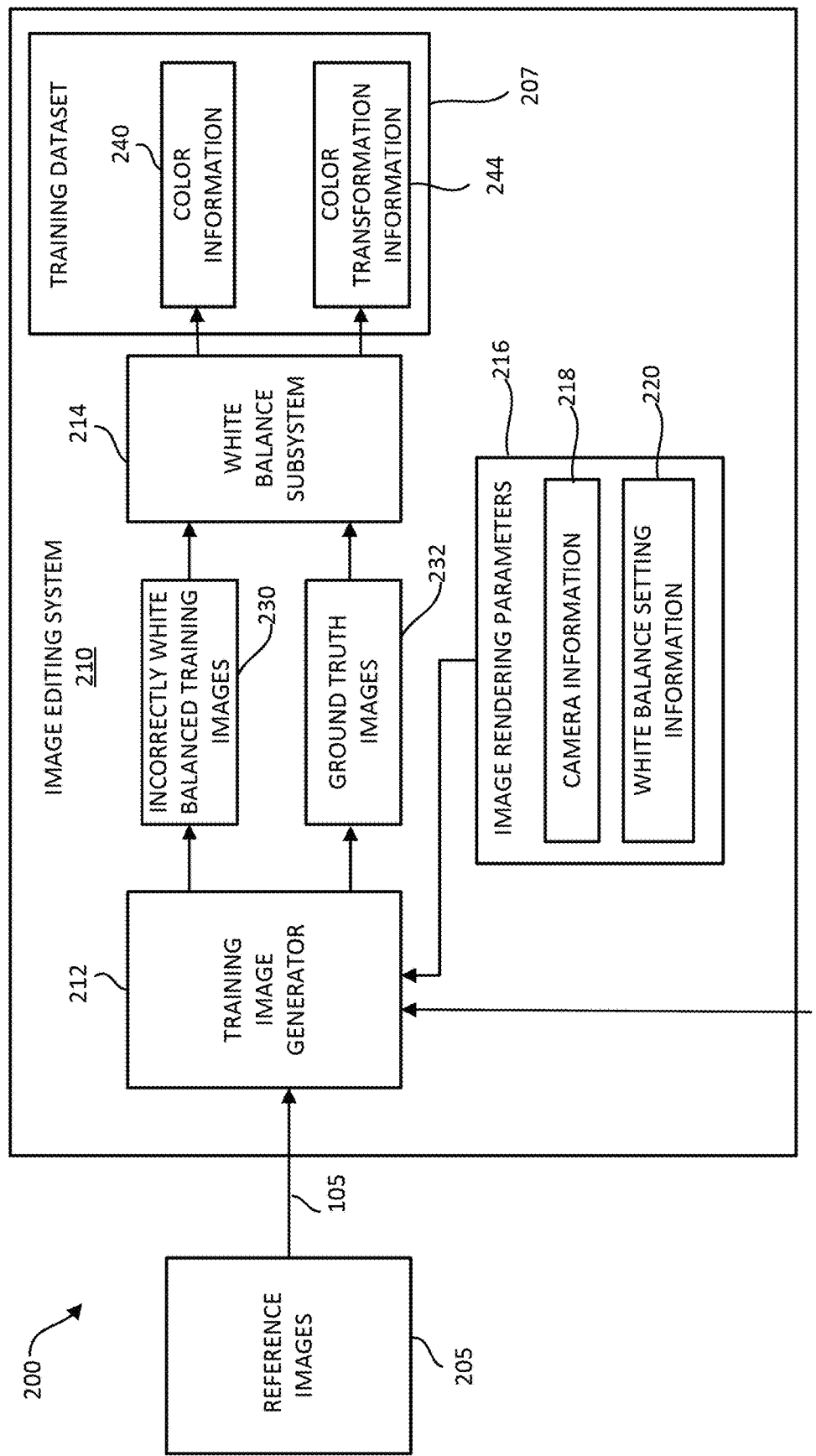
FIG. 2 depicts an example of a computing environment for generating a training dataset usable for white balancing an image, according to certain embodiments.

FIG. 2 depicts an example of a computing environment 200 for generating a training dataset 207 based on a plurality of reference images 205. The computing environment 200 includes an image editing system 210, which comprises a training image generator 212 and a white balance subsystem 214. The training image generator 212 and the white balance subsystem 214 may be implemented using software (e.g., code, instructions, program) executed by one or more processing units (e.g., processors, cores), hardware, or combinations thereof. The software may be stored on a non-transitory storage medium (e.g., on a memory device). The computing environment 200 depicted in FIG. 2 is merely an example and is not intended to unduly limit the scope of claimed embodiments. One of ordinary skill in the art would recognize many possible variations, alternatives, and modifications. For example, in some implementations, the image editing system 210 can be implemented using more or fewer systems or subsystems than those shown in FIG. 2, may combine two or more subsystems, or may have a different configuration or arrangement of the systems or subsystems.

In certain embodiments, the reference images 205 are non-white-balanced images, meaning images that have not yet had any white balancing applied to them. For example, the reference images 205 can be raw images. Raw images are available in a variety of file formats (e.g., .raw, .eip, .tif, etc.) and correspond to minimally processed data generated by the image sensor of a camera or other image capture device. Photographers often prefer raw images because they are easier to manipulate post-capture than rendered images which have already been processed through an image processing pipeline. Because raw images are not usually subjected to any color manipulations, it is possible to use conventional techniques to correctly white balance a raw image if the scene illumination is known. For example, the diagonal matrix technique described above can be applied to raw images without encountering the same problems as an image that has been nonlinearly color manipulated. In certain embodiments, at least some of the reference images 205 are ground truth images that are correctly white balanced.

As depicted in FIG. 1, the reference images 205 are input to the training image generator 212. The training image generator 212 uses the reference images 205 and image rendering parameters 216 to generate incorrectly white balanced training images 230. The image rendering parameters 216 include camera information 218 and white balance setting information 220. In certain embodiments, the camera information 218 includes information on different camera models (e.g., models from different camera manufacturers) and different camera settings (e.g., landscape, vivid, portrait, or other picture styles). The white balance setting information 220 indicates different white balance settings that are available (e.g., incandescent, cloudy, shade, auto white balance, etc.). Different camera models employ different settings. The training image generator 212 uses the image rendering parameters 216 to derive the training images 230 from the reference images 205. In certain embodiments, a plurality of training images are generated for each reference image, using different image rendering parameters. For example, a training image could be generated to emulate the result of processing the reference image through a pipeline of a particular camera model and using a particular white balance setting. Examples of training images generated from a reference image are shown in FIG. 3.

Figure 3:
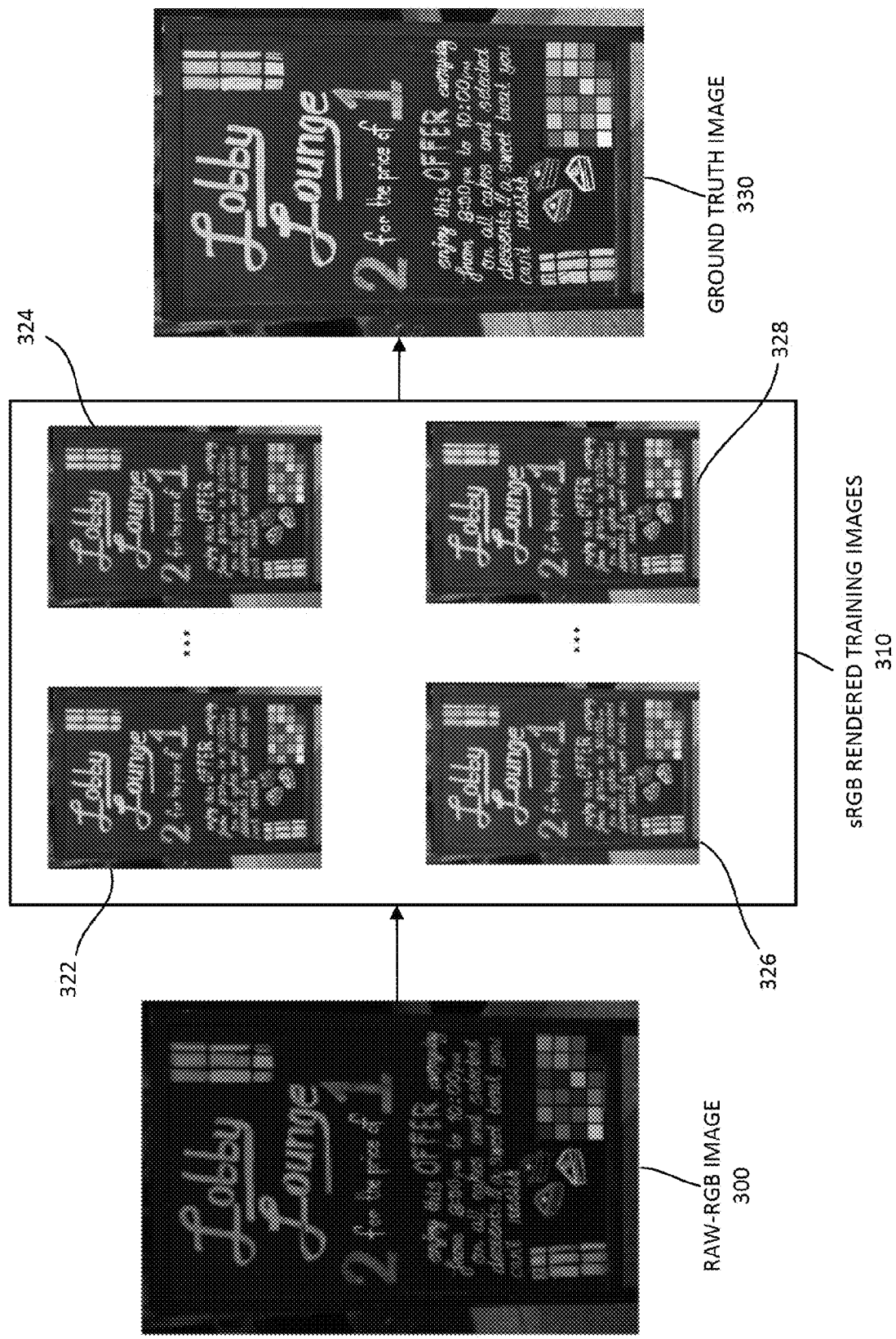
FIG. 3 depicts examples of training images and a corresponding ground truth image, according to certain embodiments disclosed herein.

FIG. 3 depicts a set of training images 310 generated from a reference image 300. In the example of FIG. 3, the reference image 300 is a raw-RGB formatted image and the training images are sRGB images generated using different image rendering parameters. The set of training images 310 includes a training image 322, a training image 324, a training image 326, and a training image 328. The training image 322 was rendered using a white balance setting of incandescent and a picture style of landscape. The training image 324 was rendered using a white balance setting of incandescent and a picture style of portrait. The training image 326 was rendered using a white balance setting of cloudy and a picture style of landscape. The training image 328 was rendered using a white balance setting of cloudy and a picture style of portrait. Thus, any number of training images can be generated for a given reference image. In certain embodiments, training images are generated using the Adobe Camera Raw feature in Adobe Photoshop software, available from Adobe Inc. of San Jose, Calif.

FIG. 3 also depicts a ground truth image 330 representing the ground truth for each of the training images 322, 324, 326, and 328. As shown in FIG. 3, each of the training images 322, 324, 326, and 328 deviates from the ground truth image 330 and is incorrectly white balanced as result of applying the various image rendering parameters mentioned above. In FIG. 3, the reference image 300 includes a color rendition chart. One way to generate a ground truth image for a training image is based on a color reference selected from a patch in a color rendition chart. This is similar to the selection of the white reference from the color rendition chart patch described earlier in connection with generating the image 120 in FIG. 1, except that the selection is performed on a color rendition chart in a reference image (e.g., reference image 300).

Returning to FIG. 2, the training image generator 212 generates ground truth images 232 based on color references 234. In certain embodiments, the color references 234 are provided to the training image generator 212 through user input that indicates, for any given reference image 205, a white reference representing the ground truth white. If the reference image 205 includes a color rendition chart, the white reference can be indicated by selecting a particular patch within the color rendition chart (e.g., one of the middle gray patches). Once the color reference has been identified, a ground truth image is generated from the reference image 205 using a camera-independent rendering style, for example, the Adobe Standard rendering style available in Adobe Photoshop.

The white balance subsystem 214 is configured to generate the training dataset 207 based on the training images 230 and the ground truth image 232. As an alternative to directly storing the training images 230 in the training dataset 207, in certain embodiments, the white balance subsystem 214 computes color information 240 for each training image 230. The color information 240 is a compact representation of the color characteristics of the training images and can be derived, for example, from a color histogram of the training image.

After computing the color histograms, the white balance subsystem 214 computes a feature vector for each histogram. The feature vector can be stored as part of the color information 240. The feature vector represents the contents of the histogram in fewer dimensions, and therefore further reduces the amount of information that is stored as color information 240. In certain embodiments, the generating of the feature vectors involves applying principal component analysis (PCA) to the histograms. PCA is a statistical process that reduces the dimensionality of a dataset comprising a larger set of variables, which are possibly correlated, to a smaller set of variables that retains most of the information from the larger set. The variables in the smaller set are uncorrelated and known as principal components. As an alternative to PCA, in certain embodiments, feature vectors are generated using a trained neural network that maps a vectorized representation of a histogram to a feature vector.

In addition to the color information 240, the training dataset 207 includes color transformation information 244. The color transformation information 244 describes color transformations computed by the white balance subsystem 214 to white balance the training images 230. In particular, a color transformation is computed for each individual training image to optimize the white balance of the training image. In certain embodiments, the white balance subsystem 214 computes a color transformation for a training image based on a comparison between the color values of the training image and the color values of the corresponding ground truth image. The computation of histograms, feature vectors, and color transformations is described in further detail below.

Figure 4:
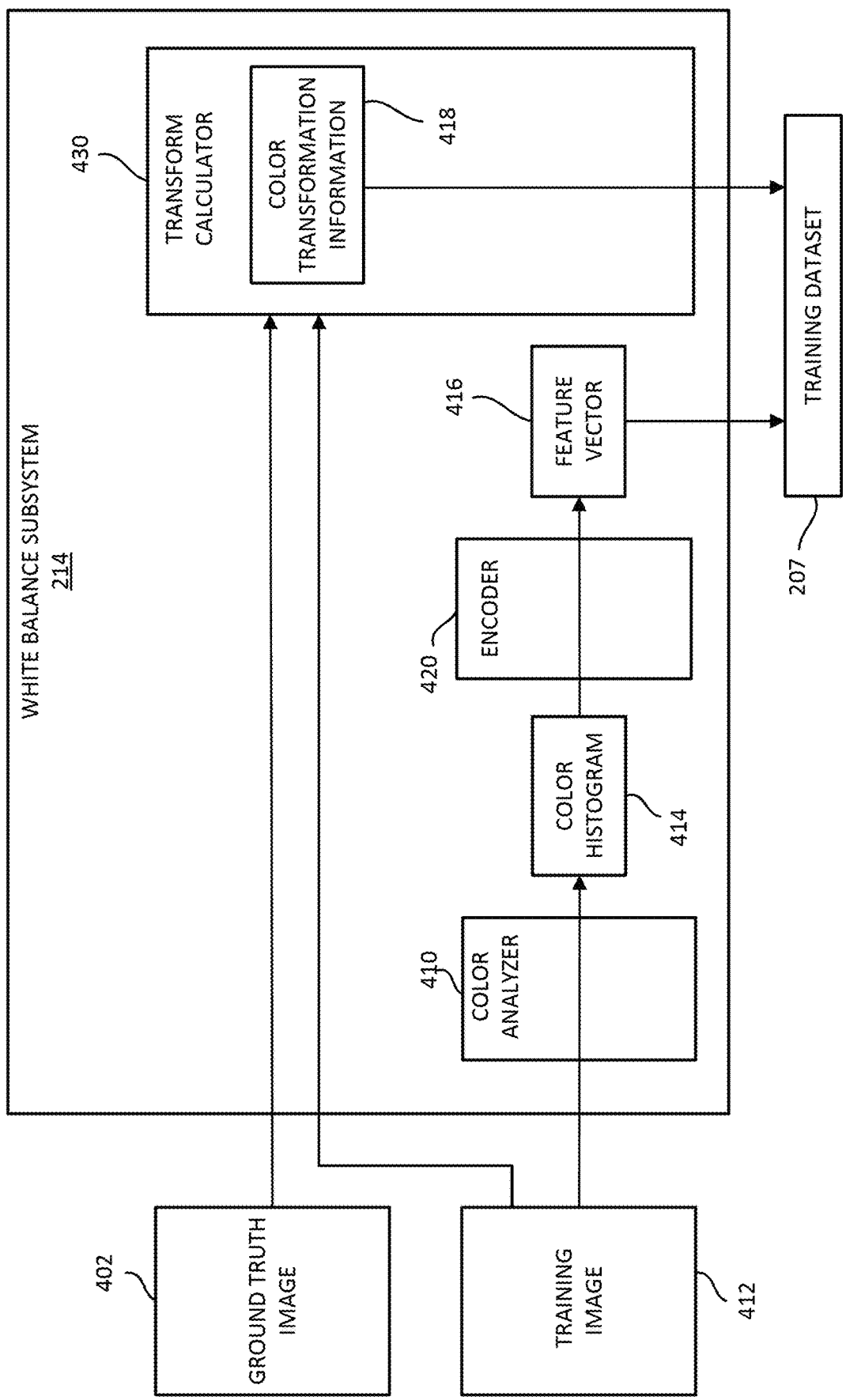
FIG. 4 depicts an example of computing system components configured to generate a training dataset, according to certain embodiments disclosed herein.

FIG. 4 depicts an embodiment of the white balance subsystem 214 in FIG. 1. In the example of FIG. 4, the white balance subsystem 214 includes a color analyzer 410, an encoder 420, and a transform calculator 430. The color analyzer 410 receives a training image 412 and a corresponding ground truth image 402. The color analyzer 410 computes a color histogram 414 for the training image 412. The histogram 414 is computed based on the color values of each pixel in the training image.

In certain embodiments, the histogram 414 represents the color distribution of the training image as an m×m×3 tensor that is parameterized by the u and v values from a CIELUV color space representation of the training image. Each bin in the histogram has the same width. The value of m depends on the bin width. The three values in the third dimension of the tensor correspond to the RGB values of a pixel. Because the histogram is computed from RGB and uv values, such a histogram is referred to herein as an RGB-uv histogram. In certain embodiments, the RGB-uv histogram is computed in the log-chrominance space according to a function h(I) described by the following equations:

$$I_{y(i)} = \sqrt{I_{R(i)}^2 + I_{G(i)}^2 + I_{B(i)}^2}, \qquad (1)$$
$$I_{u1(i)} = \log(I_{R(i)}) - \log(I_{G(i)}),$$
$$I_{v1(i)} = \log(I_{R(i)}) - \log(I_{B(i)}),$$
$$I_{u2} = -I_{u1}, \ I_{v2} = -I_{u1} + I_{v1},$$
$$I_{u3} = -I_{v1}, \ I_{v3} = -I_{v1} + I_{u1}.$$

$$H(I)_{(u,v,C)} = \sum_i I_{y(i)} \left[ |I_{uC(i)} - u| \le \frac{\varepsilon}{2} \wedge |I_{vC(i)} - v| \le \frac{\varepsilon}{2} \right], \qquad (2)$$

$$h(I)_{(u,v,C)} = \sqrt{\frac{H(I)_{(u,v,C)}}{\sum_{u'}\sum_{v'} H(I)_{(u',v',C)}}}, \qquad (3)$$

where I is the image for which the histogram is being computed, with I being represented by a 3×N matrix comprising RGB values for each of the N number of pixels in the image (R, G, and B each representing a separate color channel in the image), i={1, 2, . . . N}, C∈{1, 2, 3} and represents each color channel in the histogram, and ε is the histogram's bin width. The above equations are merely one example of how a color histogram can be computed for an image. Other suitable methods of determining the color characteristics of an image would be apparent to one of ordinary skill in the art.

Once computed, the histogram 414 is input to the encoder 420, which generates a feature vector 416 from the histogram 414. The feature vector 416 is a compact representation of the histogram 414. As mentioned earlier, feature vectors can be computed using a trained neural network, in which case the encoder 420 can be implemented as a neural network based autoencoder. Alternatively, the encoder 420 can compute the feature vector 416 using PCA. In certain embodiments, a PCA feature vector v(I) is computed based on the following equation:

$$v(I) = W^T(\text{vec}(h(I)) - b), \qquad (4)$$

where v(I) contains c number of principal components computed from a vectorized histogram vec(h(I)), W=[$w_1$, $w_2$, . . . $w_c$] is an (m×m×3)×c matrix with c number of principal component coefficients computed by singular value decomposition, and b is the mean vector for the histogram.

The transform calculator 430 computes a color transformation for the training image 412 based on a comparison of the training image 412 to the ground truth image 402. The comparison involves computing a distance metric (e.g., an $L_2$ distance) representing the degree of similarity between the color values of the ground truth image 402 and the training image 412. Here, the $L_2$ distance can be computed by summing, over all pixels, the square of the difference between the R values of corresponding pixels in both images, the square of the difference between the G values of corresponding pixels in both images, and the square of the difference between the B values of corresponding pixels in both images, and then taking the square root of the sum. Information 418 about the computed color transformation is then stored as part of training dataset 207. In certain embodiments, the color transformation information 418 comprises a correction matrix $M^{(i)}$ separately computed for each training image by minimizing the following equation:

$$\arg\min_{M^{(i)}} \|M^{(i)} \Phi (I_t^{(i)}) - I_{gt}^{(i)}\|_p, \quad (5)$$

where $\|.\|_F$ is the Frobenius norm (analogous to the $L_2$ distance discussed above), $\Phi$ is a kernel function that projects the RGB values of a training image $I_t$ into a higher dimensional space, and $I_{gt}$ is the corresponding ground truth image. The following is a non-limiting example of a kernel function suitable for use with embodiments described herein:

[R, G, B, RG, RB, GB, $R^2$, $G^2$, $B^2$, RGB, $1]^T$

The example kernel function above is 11-dimensional. Various kernel functions were tested by the inventors of the present disclosure, several of which produced adequate white balance results as measured according to various error metrics. The error metrics used during testing included mean squared error (MSE), mean angular error (MAE), ΔE 2000, and ΔE 76. The tested kernel functions were of different dimensions. Some, like the 11-dimensional kernel above, included nonlinear terms (e.g., $R^2$, $R^3$, $R^2G^2$, $\sqrt{(RB)}$, $\sqrt[3]{(RB)}$, etc.). During testing, it was discovered that the 11-dimensional kernel function provided good white balancing with a reasonably compact size. However, other kernel functions can also be used to implement the techniques described herein.

The white balance subsystem 214 stores the feature vector 416 and the color transformation information 418 (e.g., the correction matrix described above) in the training dataset 207 for use in subsequent white balancing of input images. Feature vectors and color transformation information can similarly be computed and stored for a plurality of training images that are derived from different reference images in order to build a large training dataset (e.g., for thousands or tens of thousands of training images). Having described the building of the training dataset, the discussion will now turn to using the training dataset to white balance an input image.

Figure 5:
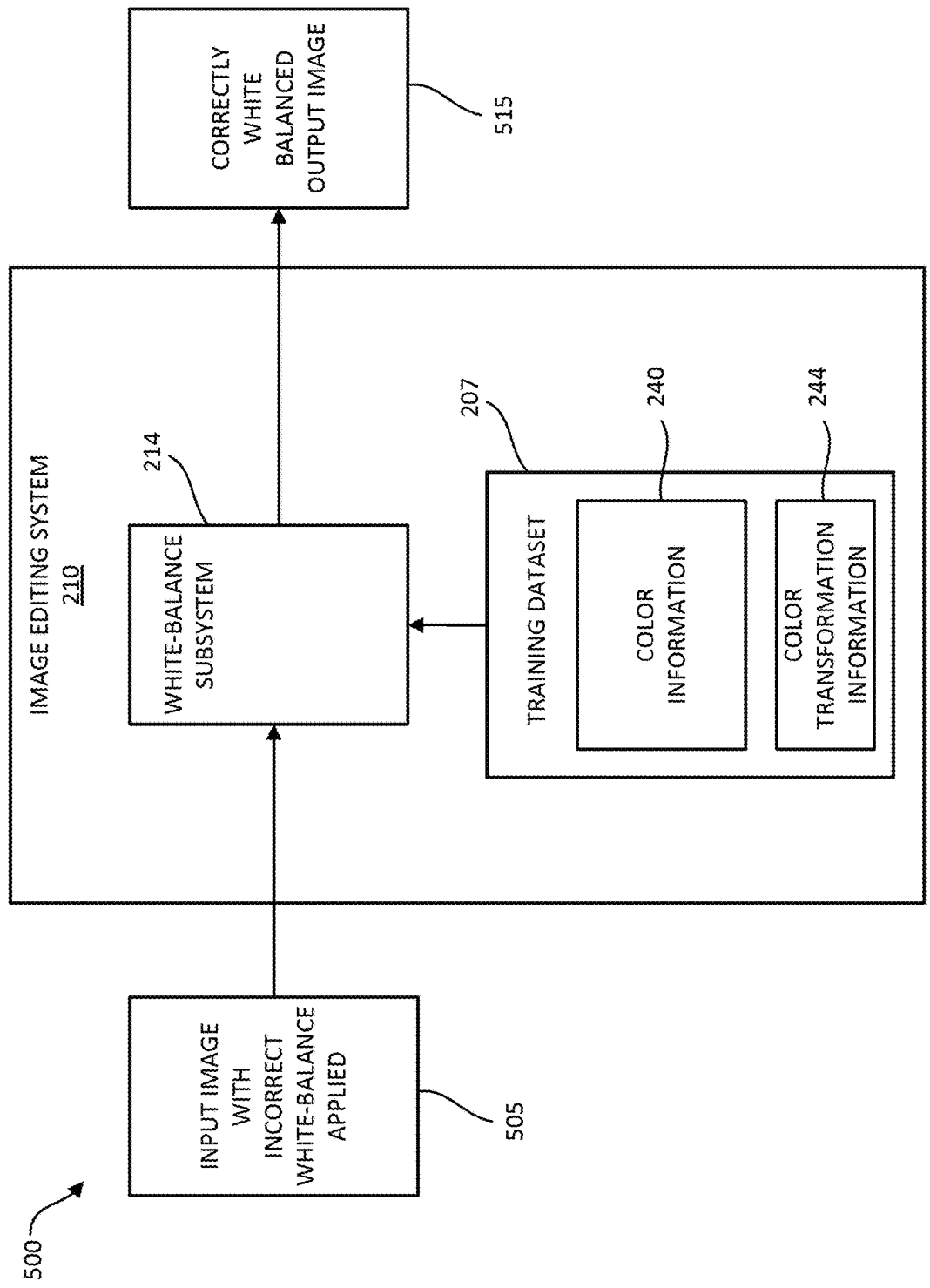
FIG. 5 depicts an example of a computing environment for white balancing an input image, according to certain embodiments.

FIG. 5 depicts a computing environment 500 comprising the image editing system 210. FIG. 5 shows the image editing system 210 in connection with operations for white balancing an input image 505. The input image 505 can be any image but, in the example of FIG. 5, is an image that has been incorrectly white balanced. For example, the input image 505 can be an image produced by an in-camera image processing pipeline with a white balancing step. As another example, the input image 505 can be an image produced based on user selection of the wrong color reference during post-capture white balancing.

As depicted in FIG. 5, the white balance subsystem 214 is configured to, based on the color information 240 and the color transformation information 244 in the training dataset 207, convert the input image 505 into an output image 515 that is correctly white balanced. Thus, the image editing system 210 can generate the training dataset (e.g., according to the example of FIG. 4) in addition to use the training dataset for white balancing input images. In other embodiments, the training dataset 207 is generated by a separate system or component for use by the image editing system 210. Details of how the color transformation can be computed for the input image 505 are described in connection with FIG. 6.

Figure 6:
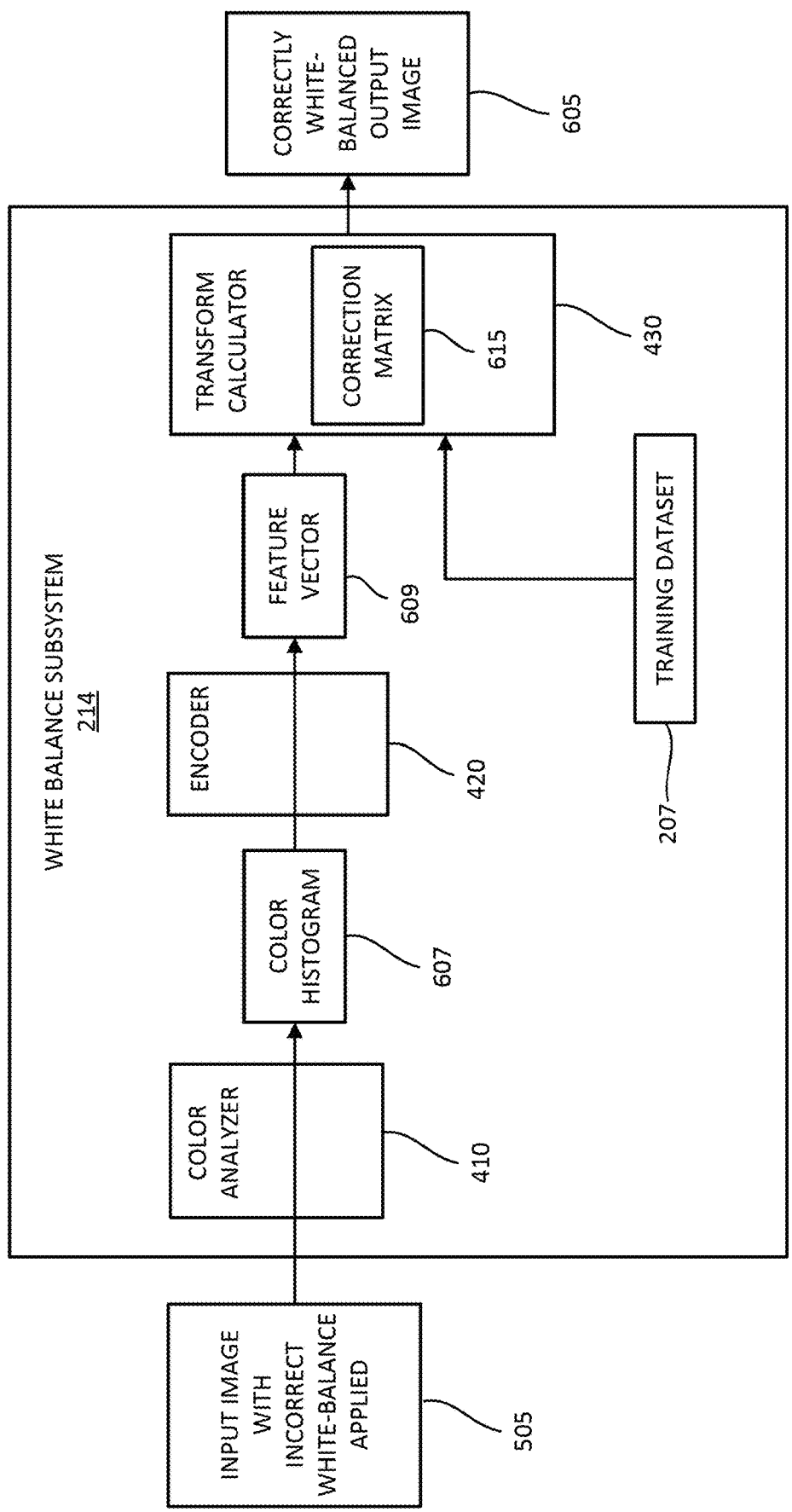
FIG. 6 depicts an example of computing system components configured to white balance an image, according to certain embodiments.

FIG. 6 depicts the white balance subsystem 214 generating a correctly white balanced output image 605 from the input image 505. In the example of FIG. 6, the white balancing is performed by the same components used in FIG. 4 for generating the training dataset 207, in particular, the color analyzer 410, the encoder 420, and the transform calculator 430. As depicted in FIG. 6, the color analyzer 410 computes a color histogram 607 for the input image 505. The color histogram 607 is computed in the same manner discussed above with respect to computing the color histograms 404 and 414 in FIG. 4. For example, the color histogram 607 is, in certain embodiments, an RGB-uv histogram computed based on the color values of each pixel in the input image 505.

The encoder 420 generates a feature vector 609 based on the color histogram 607. The generating of the feature vector 609 is performed in the same manner described above with respect to the generating of the feature vectors 406 and 416. For example, in certain embodiments, the feature vector 609 is a PCA vector computed by applying PCA to the color histogram 607.

The transform calculator 430 determines a color transformation for white balancing the input image 505. As part of computing the color transformation, the transform calculator 430 computes a correction matrix 615 based on identifying training images that are most similar to the input image 505 in terms of color. In certain embodiments, the transform calculator is configured to identify k number of nearest-neighbor training images based on a comparison of the feature vector 609 to feature vectors in the training dataset 207. The value of k can vary. In general, increasing k will increase the accuracy of the white balancing up to a certain point, beyond which point further increases in k will adversely affect the accuracy as a result of overfitting. During the testing discussed earlier, a combination of an 11-dimensional kernel function and k=25 was found to provide good accuracy. However, other combinations of kernel functions and k values are also suitable. Once the k training images have been identified, the correction matrix 615 can be computed as a matrix M described by the following equation:

$$M = \sum_{j=1}^{k} \alpha_j M_s^{(j)}, \quad (6)$$

where α is a weighting vector represented as a radial basis function:

$$\alpha_j = \frac{\exp(-d_j^2/2\sigma^2)}{\sum_{k'=1}^{k} \exp(-d_{k'}^2/2\sigma^2)}, j \in [1, \ldots, k], \quad (7)$$

where d is a vector containing values for a distance metric (e.g., $L_2$ distance) representing the degree of similarity between the feature vector 609 and the feature vectors previously computed for the k training images (e.g., the feature vector 416 in FIG. 4), σ is a radial fall-off factor that can be used as a tuning parameter for scaling the distance metric values, and $M_s$ is a correction matrix for a training image, e.g., according to Equation 5 above.

Thus, in certain embodiments, the correction matrix 615 is computed as a weighted linear combination of correction matrices previously computed for similar training images, where the weighting varies depending on the degree of color similarity between the input image 505 and the training images. However, unlike the computing of the color transformation information 418 in FIG. 4, the degree of color similarity is determined based on comparison of feature vectors rather than direct comparison of pixel color values. Comparing feature vectors is less computation intensive and allows similar training images to be identified faster than direct comparison of color values. After computing the correction matrix 615, the white balance subsystem 214 applies the color transformation to the input image 505 as follows:

$$I_{corr} = M\Phi(I_{in}) \quad (8)$$

where $I_{corr}$ is the correctly white balanced output image 605, $I_{in}$ is the input image 505, and Φ is a kernel function (e.g., an 11-dimensional kernel function) computed for the input image 505 in the same manner as described earlier with respect to kernel functions for the training images.

Figure 7:
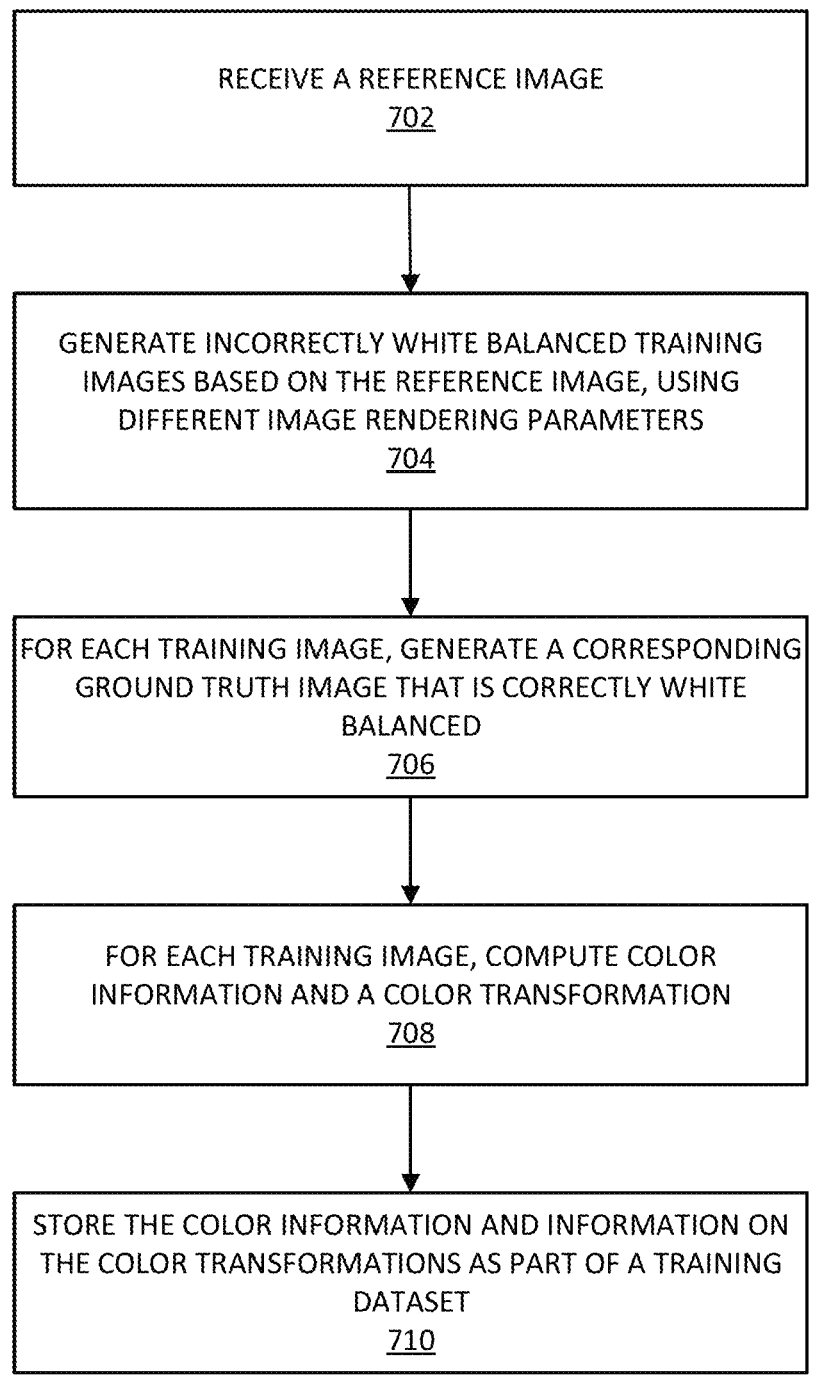
FIG. 7 depicts an example of a process for generating a training dataset, according to certain embodiments.

FIG. 7 depicts an example of a process 700 for generating a training dataset usable for white balancing an image, according to certain embodiments of the present disclosure. One or more computing devices (e.g., the image editing system 210) implement the operations depicted in FIG. 7 by executing suitable program code. The software or program code may be stored on a non-transitory storage medium (e.g., on a memory device). The process depicted in FIG. 7 and described below is intended to be illustrative and non-limiting. Although FIG. 7 depicts the various processing blocks occurring in a particular sequence or order, this is not intended to be limiting. In certain alternative embodiments, the blocks may be performed in some different order or some blocks may also be performed in parallel. In certain embodiments, such as in the embodiments depicted in FIGS. 2 and 4, the processing depicted in FIG. 7 may be performed by one or more components of the image editing system 210. For illustrative purposes, the process 700 is described with reference to certain examples depicted in the figures. Other implementations, however, are possible.

At 702, a reference image is received. The reference image is preferably a minimally processed image that has not yet been white balanced or otherwise color manipulated. For example, the reference image can be a raw-RGB image as depicted in the example of FIG. 3. Alternatively, in some embodiments, the reference image is a ground truth image that has already been correctly white balanced.

At 704, a plurality of training images are generated based on the reference image received in 702. Each training image is an incorrectly white balanced image, generated using one or more image rendering parameters to emulate a result of processing the reference image through an image processing pipeline that employs the one or more image rendering parameters. Different rendering parameters and/or different combinations of rendering parameters are used to generate the training images. For example, as described earlier in connection with FIG. 3, the image rendering parameters can include different camera models, different picture styles (portrait, landscape, vivid, etc.), different white balance settings (incandescent, cloudy, etc.), or any combination thereof. In certain embodiments, the image rendering parameters used for at least some of the training images are parameters that influence the behavior of a nonlinear color manipulation performed as part of generating the training image. In this manner, the training images would include images that reflect image processing involving nonlinear color manipulation.

At 706, a corresponding ground truth image is generated for each training image generated in 704. The ground truth image is an image that is correctly white balanced. As discussed earlier in connection with FIG. 2, one way to generate the ground truth image is based on user selection of a color reference (e.g., a patch within a color rendition chart included in the reference image). It should be noted that a separate ground truth image does not have to be individually generated for each training image, since training images derived from the same reference image can share the same ground truth, as depicted in FIG. 3. Further, if the reference image received in 702 is already a ground truth image, the processing in 706 can be omitted entirely.

At 708, color information and a color transformation are computed for each training image. As discussed earlier, the color information can include information describing a color distribution in the training image, in the form of a histogram or a representation of a histogram (e.g., a PCA feature vector generated by applying principal component analysis to a histogram). In certain embodiments, the color information computed for each training image is based on the RGB-uv histogram discussed above in connection with FIG. 4. The color transformation maps the training image to its corresponding ground truth image, and therefore white balances the training image. In certain embodiments, the color transformation includes a correction matrix component and a kernel function component, as shown in Equation 5 above.

At 710, the color information is stored as part of a training dataset (e.g., training dataset 207) along with information about the color transformations computed in 708. The color transformations computed in 708 do not have to be stored in their entirety. For example, the color transformation information stored in 710 may include the correction matrices computed according to Equation 5 above, without including the kernel functions.

The processing in FIG. 7 can be repeated to generate a training dataset comprising color information and color transformation information for many training images and for different reference images. This would enable similar training image matches to be found for any given input image.

Figure 8:
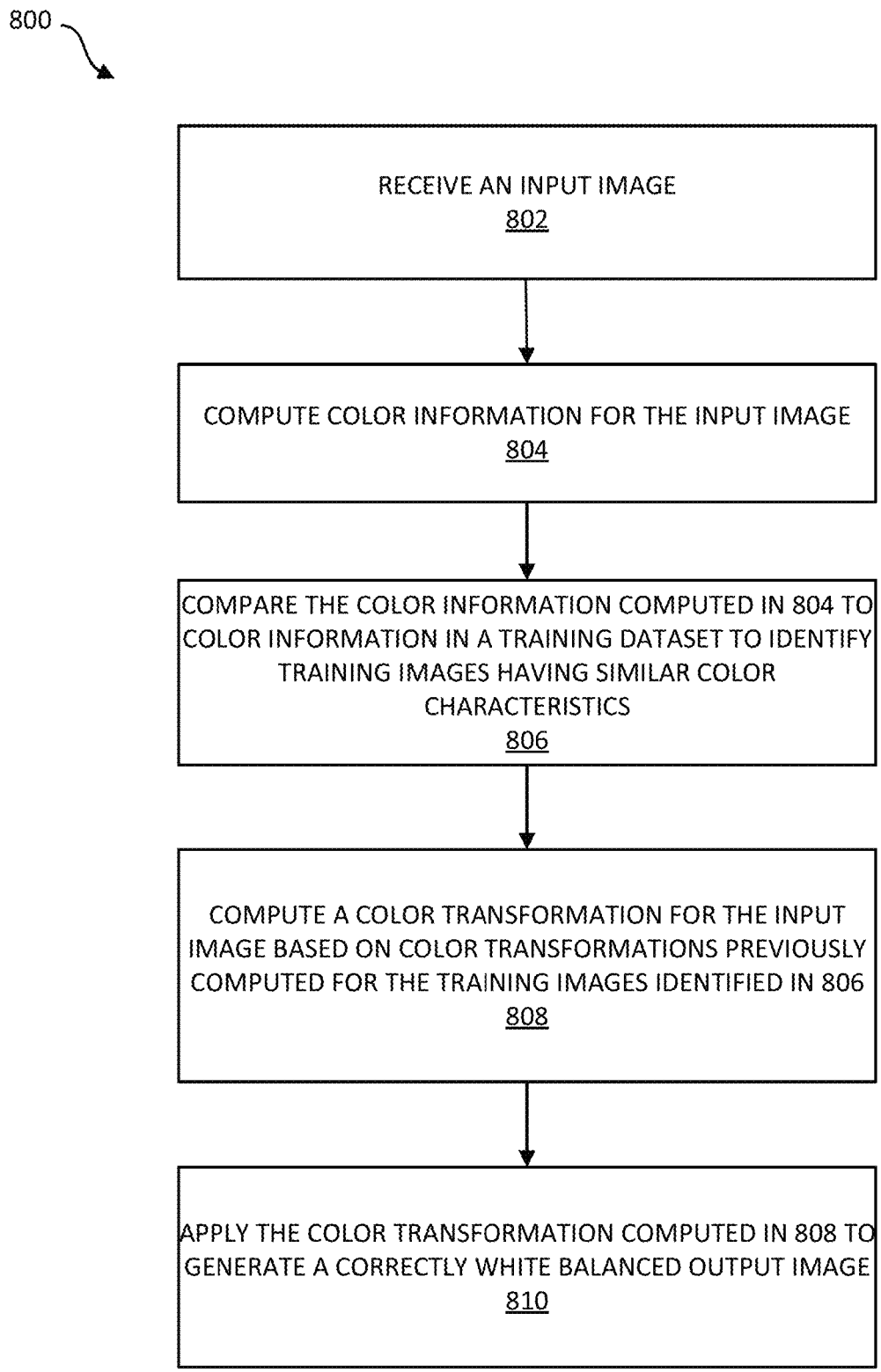
FIG. 8 depicts an example of a process for white balancing an image, according to certain embodiments.

FIG. 8 depicts an example of a process 800 for white balancing an input image, according to certain embodiments. One or more computing devices (e.g., the image editing system 210) implement the operations depicted in FIG. 8 by executing suitable program code. The software or program code may be stored on a non-transitory storage medium (e.g., on a memory device). The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order or some blocks may also be performed in parallel. In certain embodiments, such as in the embodiments depicted in FIGS. 5 and 6, the processing depicted in FIG. 8 may be performed by one or more components of the image editing system 210. For illustrative purposes, the process 800 is described with reference to certain examples depicted in the figures. Other implementations, however, are possible.

At 802, an input image is received. The input image can be any image for which white balancing is desired. The input image can, for example, be a raw camera image, a processed camera image (e.g., an sRGB image that has been subjected to in-camera white balancing), a digital painting, a computer-generated graphic, or any other artifact that depicts visual perception.

At 804, color information is computed for the input image. The color information may, as discussed earlier, be generated as a histogram or a representation of a histogram (e.g., a PCA feature vector generated by applying principal component analysis to a histogram). In certain embodiments, the color information computed for the input image is based on the RGB-uv histogram discussed above in connection with FIG. 4.

At 806, the color information computed in 804 is compared to color information in a training dataset (e.g., training dataset 207) to identify training images having similar color characteristics (e.g., color distribution computed based on color values of each pixel in the image). As explained earlier, color information can be represented as feature vectors derived from histograms, and the comparison can identify a certain number of training images that are most similar in color to the input image (e.g., a subset of the set of training images for which information is stored in the training dataset 207).

At 808, a color transformation is computed for the input image based on color transformations previously computed for the training images identified in 806. In certain embodiments, the color transformation for the input image involves a linear combination of color transformation components for the training images in 806. For example, as explained earlier, the color transformations for both the input image and the training images can involve applying a correction matrix in combination with a kernel function, where the correction matrix for the input image is a weighted linear combination of correction matrices for the training images that are most similar in color to the input image, and where the weighting is based on a distance metric indicative of the degree of similarity between the color characteristics of the input image and the color characteristics of a training image.

At 810, the color transformation computed in 808 is applied to generate a correctly white balanced output image. As described in connection with Equation 8 above, one example of a color transformation is a matrix multiplication in which the operands are a correction matrix, a kernel function, and a matrix representing the color values of each pixel in the input image. The output image generated in 810 is white balanced to the effect that the output image corresponds to what the input image would look like had the input image been generated under white illumination. One way to evaluate the accuracy of the white balancing of the input image would be to apply the Frobenius norm in Equation 5 above, but substituting the input image for the training image, and provided that a ground truth is available for the input image. The output image does not have to exactly match the ground truth for the input image. Instead, the output image is considered correctly white balance so long as the difference between the output image and the ground truth for the input image is minimized, e.g., as measured according to Equation 5.

Figure 9:
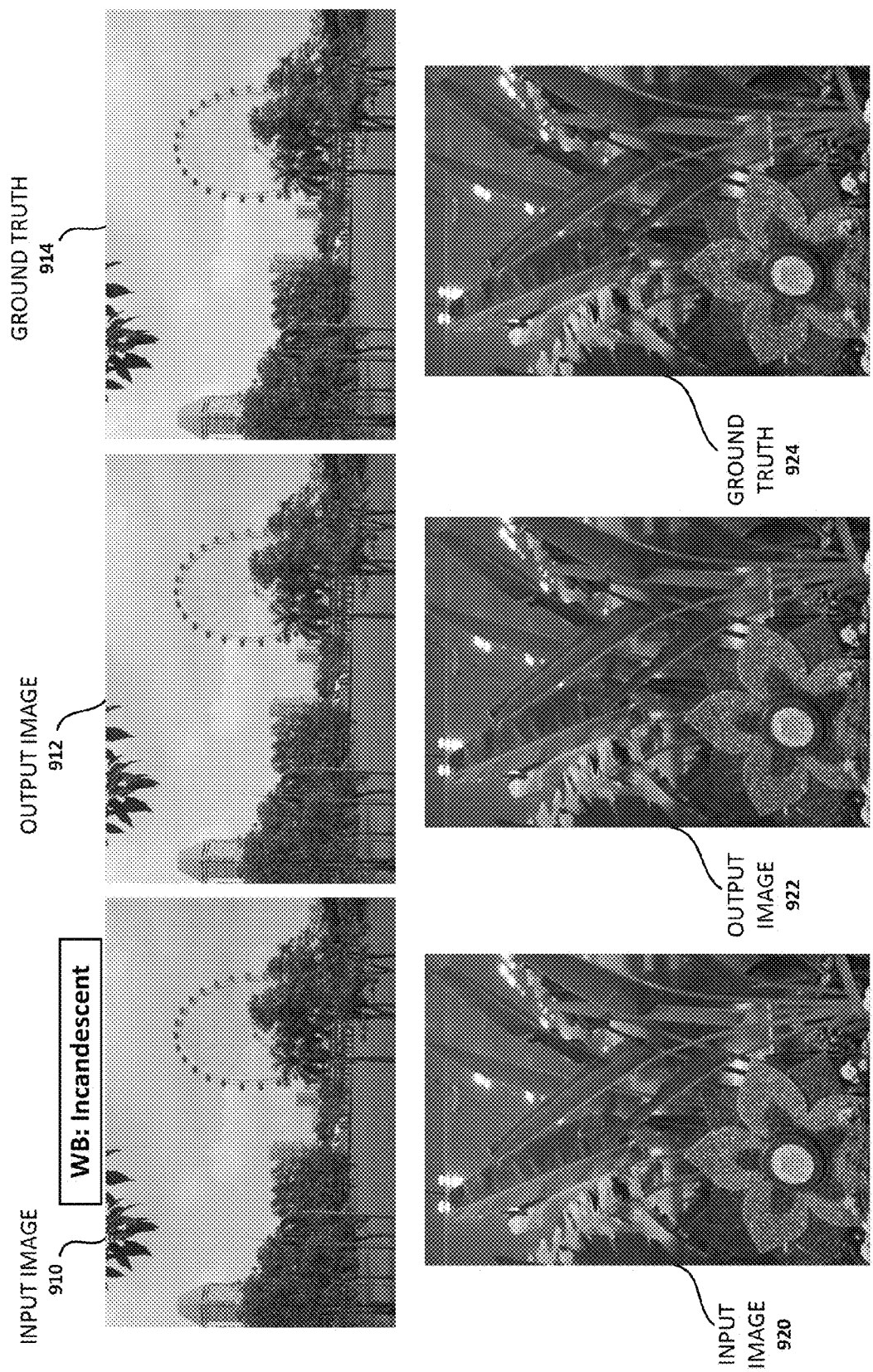
FIG. 9 depicts examples of output images generated according to the white balancing techniques disclosed herein.

FIG. 9 depicts examples of output images 912 and 922 generated according to the white balancing techniques disclosed above. The output image 912 was generated based on an input image 910 rendered using an incandescent white balance setting. The output image 922 was generated based on an input image 920 rendered using a shade white balance setting. As apparent from a visual comparison of the output image 912 to a ground truth image 914 corresponding to the input image 910, the output image 912 is substantially similar in color to the ground truth image 914. Similarly, the output image 922 is substantially similar in color to a ground truth image 924 corresponding to the input image 920. In contrast, the input image 910 is noticeably blue tinted and the input image 920 is noticeably yellow tinted.

Figure 10:
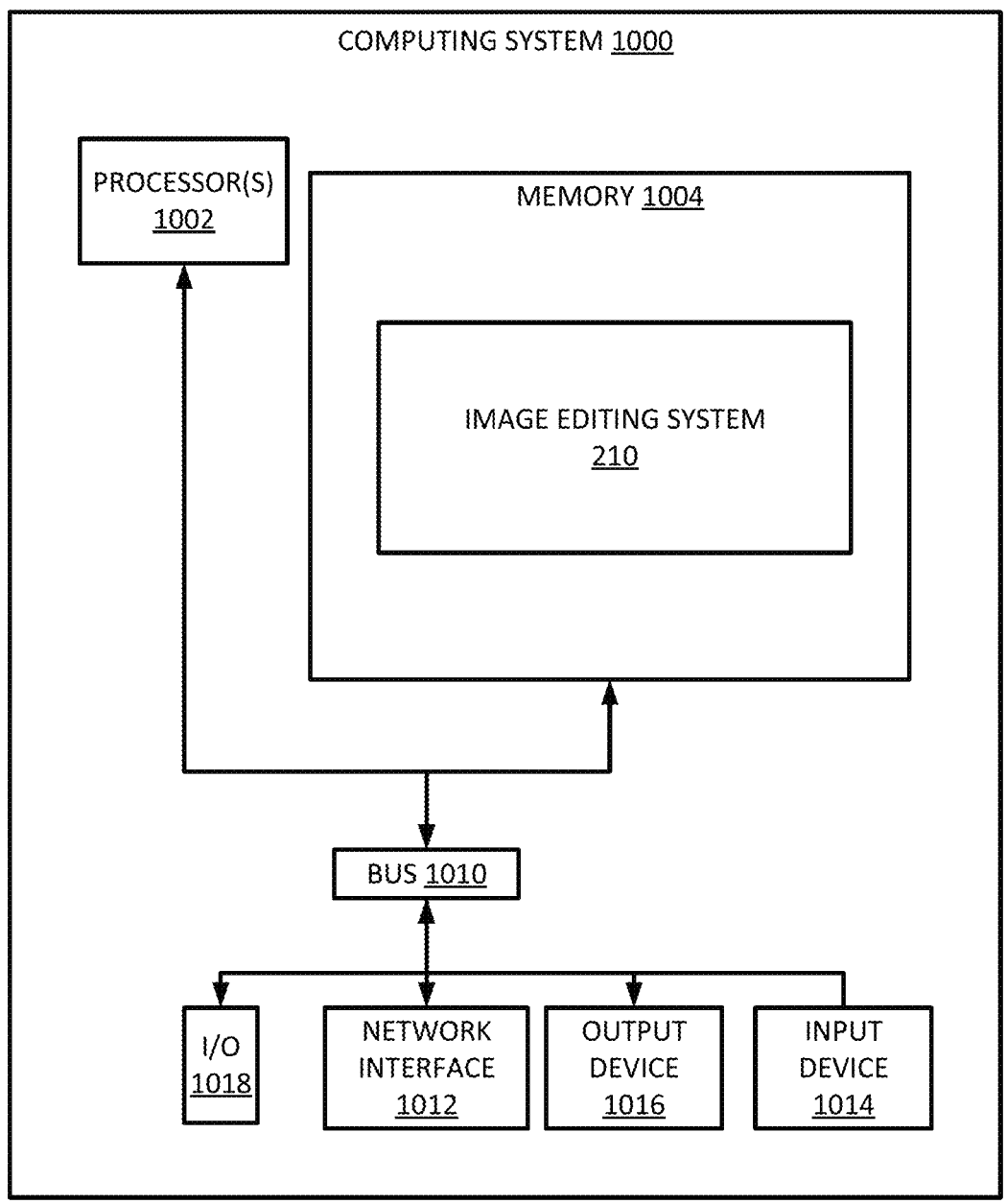
FIG. 10 depicts an example of a computing system for implementing certain embodiments disclosed herein.

Any suitable computing system or group of computing systems can be used for performing the operations described herein. For example, FIG. 10 depicts an example of a computing system 1000 that can implement any of the computing systems or environments discussed above (e.g., the computing environments of FIGS. 2 and 5). In some embodiments, the computing system 1000 includes a processing device 1002 that executes the image editing system 210 including the white balance subsystem 214, a memory that stores various data computed or used by the image editing system 210, an input device 1014 (e.g., a mouse, a stylus, a touchpad, a touchscreen, etc.), and an output device 1016 that presents output to a user (e.g., a display device that displays graphical content generated by the image editing system 210). For illustrative purposes, FIG. 10 depicts a single computing system on which the image editing system 210 is executed, and the input device 1014 and output device 1016 are present. But these applications, datasets, and devices can be stored or included across different computing systems having devices similar to the devices depicted in FIG. 10.

The example of FIG. 10 includes a processing device 1002 communicatively coupled to one or more memory devices 1004. The processing device 1002 executes computer-executable program code stored in a memory device 1004, accesses information stored in the memory device 1004, or both. Examples of the processing device 1002 include a microprocessor, an application-specific integrated circuit ("ASIC"), a field-programmable gate array ("FPGA"), or any other suitable processing device. The processing device 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 1000 may also include a number of external or internal devices, such as input device 1014, output device 1016, or other input or output devices. For example, the computing system 1000 is shown with one or more input/output ("I/O") interfaces 1008. An I/O interface 1008 can receive input from input devices or provide output to output devices. One or more buses 1010 are also included in the computing system 1000. Each bus 1010 communicatively couples one or more components of the computing system 1000 to each other or to an external component.

The computing system 1000 executes program code that configures the processing device 1002 to perform one or more of the operations described herein. The program code includes, for example, code implementing the image editing system 210 or other suitable applications that perform one or more operations described herein. The program code may be resident in the memory device 1004 or any suitable computer-readable medium and may be executed by the processing device 1002 or any other suitable processor. In some embodiments, all modules in the image editing system 210 (e.g., the white balance subsystem 214) are stored in the memory device 1004, as depicted in FIG. 10. In additional or alternative embodiments, one or more of these modules from the image editing system 210 are stored in different memory devices of different computing systems.

In some embodiments, the computing system 1000 also includes a network interface device 1012. The network interface device 1012 includes any device or group of devices suitable for establishing a wired or wireless data connection to one or more data networks. Non-limiting examples of the network interface device 1012 include an Ethernet network adapter, a modem, and/or the like. The computing system 1000 is able to communicate with one or more other computing devices (e.g., a computing device that receives inputs for image editing system 210 or displays outputs of the image editing system 210) via a data network using the network interface device 1012.

An input device 1014 can include any device or group of devices suitable for receiving visual, auditory, or other suitable input that controls or affects the operations of the processing device 1002. Non-limiting examples of the input device 1014 include a touchscreen, stylus, a mouse, a keyboard, a microphone, a separate mobile computing device, etc. An output device 1016 can include any device or group of devices suitable for providing visual, auditory, or other suitable sensory output. Non-limiting examples of the output device 1016 include a touchscreen, a monitor, a separate mobile computing device, etc.

Although FIG. 10 depicts the input device 1014 and the output device 1016 as being local to the computing device that executes the image editing system 210, other implementations are possible. For instance, in some embodiments, one or more of the input device 1014 and the output device 1016 can include a remote client-computing device that communicates with the computing system 1000 via the network interface device 1012 using one or more data networks described herein.

Figure 11:
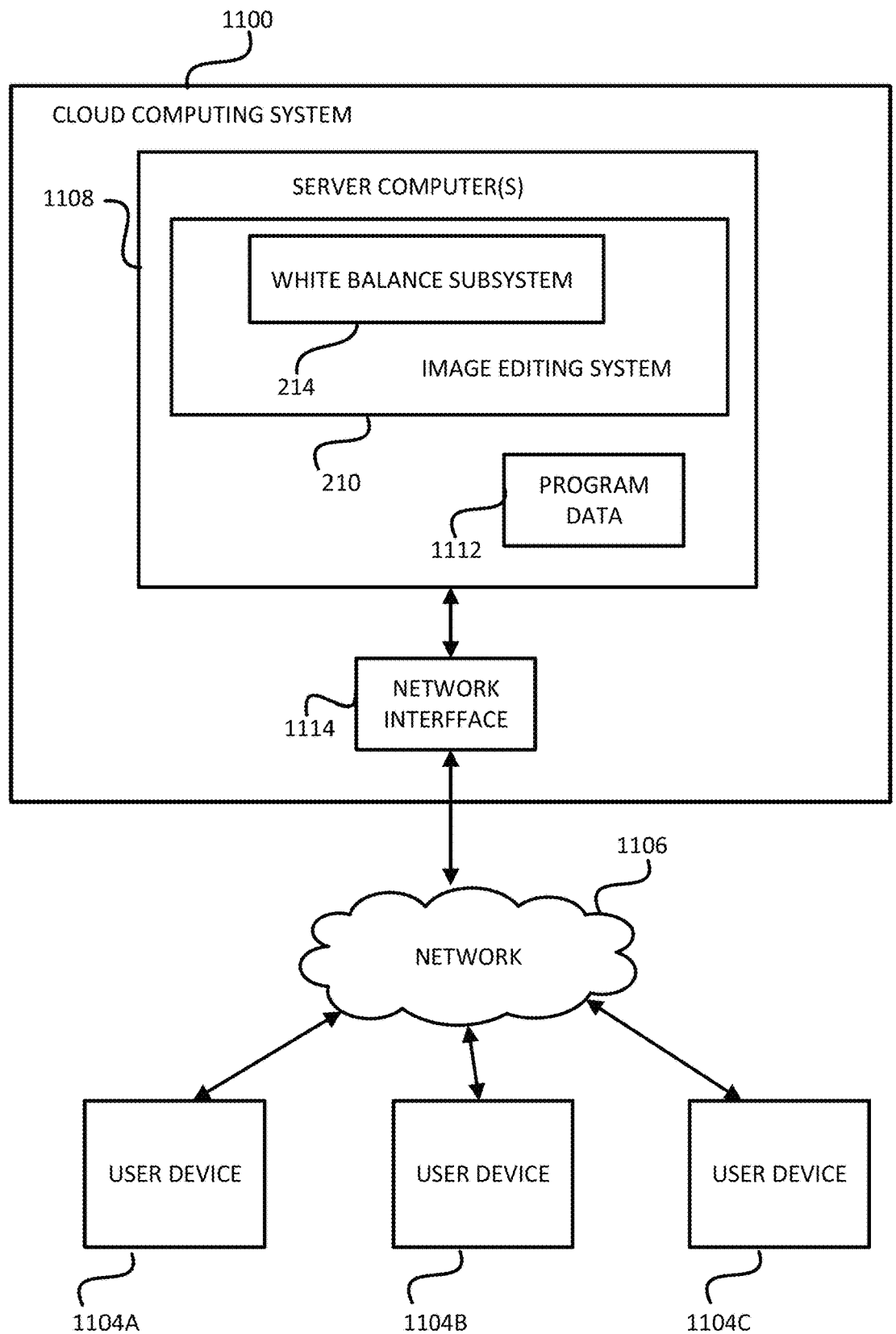
FIG. 11 depicts an example of a cloud computing system for implementing certain embodiments disclosed herein.

In some embodiments, the functionality provided by the image editing system 210 may be offered as cloud services by a cloud service provider. For example, FIG. 11 depicts an example of a cloud computing system 1100 offering an image editing service as a cloud service that can be subscribed to by one or more subscribers. Subscribers can interact with cloud computing system 1100 via one or more user devices 1104A, 1104B, and 1104C that are capable of communicating with the cloud computing system 1100 via a communication network 1106. Communication network 1106 may be any type (or types) of network that facilitates communications between cloud computing system 1100 and the user devices 1104A-C. Communication network 1106 may support various data communication protocols including, without limitation, wired and wireless protocols. Merely by way of example, network 1106 can be the Internet, a local area network (LAN), an Ethernet, a wide-area network (WAN), a virtual private network (VPN), an intranet, an extranet, a public switched telephone network (PSTN), and the like.

The cloud computing system 1100 also includes a network interface device 1114 that enables communications to and from cloud computing system 1100. In certain embodiments, the network interface device 1114 includes any device or group of devices suitable for establishing a wired or wireless data connection to network 1106. Non-limiting examples of the network interface device 1114 include an Ethernet network adapter, a modem, and/or the like. The cloud computing system 1100 is able to communicate with the user devices 1104A, 1104B, and 1104C via the network 1106 using the network interface device 1114.

In certain embodiments, the white balance functionality described herein may be offered as a cloud service under a Software as a Service (SaaS) model. One or more users may subscribe to an image editing service offering the white balance functionality, and the cloud computing system 1100 performs the processing to provide the image editing service to subscribers.

The cloud computing system 1100 may include one or more remote server computers 1108 that provide the cloud services offered by cloud computing system 1100. The remote server computers 1108 include any suitable non-transitory computer-readable medium for storing program code (e.g., code implementing image editing system 210), program data 1112, or both, which is used by the cloud computing system 1100 for providing the cloud services. A non-transitory computer-readable medium can include any electronic, optical, magnetic, or other storage device capable of storing computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 1108 can include volatile memory, non-volatile memory, or a combination thereof.

The one or more of the servers 1108 can include one or more processors that are configured to execute the program code to perform one or more of the operations that provide image editing services, including the ability to white balance an input image. As depicted in the embodiment in FIG. 11, the one or more servers providing the services to white balance an image may implement the image editing system 210 including white balance subsystem 214. Any other suitable systems or subsystems that perform one or more operations described herein (e.g., one or more development systems for configuring an interactive user interface) can also be implemented by the cloud computing system 1100.

In certain embodiments, the cloud computing system 1100 may implement the services by executing program code and/or using program data 1112, which may be resident in a memory device of the server computers 1108 or any suitable computer-readable medium and may be executed by the processors of the server computers 1108 or any other suitable processor.

In some embodiments, the program data 1112 includes program code executable by the one or more processors, and other data (e.g., the training dataset 207, image data, histograms, feature vectors, color transformation information, etc.) used for providing the white balance functionality. In some embodiments, one or more of the data, models, or functions described herein are stored in the same memory device. In additional or alternative embodiments, one or more of the programs, data, models, or functions are stored in different memory devices accessible via the network 1106.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more computing systems perform operations comprising:
   receiving an input image whose white balance is to be corrected;
   for each training image in a set of training images, computing a similarity metric indicative of a degree of color similarity between the input image and the training image;
   identifying, within the set of training images and based on the similarity metrics computed for the set of training images, a subset of training images that are most similar to the input image;
   determining a color transformation for the input image, wherein the color transformation is computed based on color transformations for white balancing the subset of training images, wherein the color transformations for white balancing the subset of training images are determined independent of the input image, and the color transformation for a particular training image is configured to minimize a difference between the training image and a ground truth image provided for the training image, the ground truth image being a white balanced version of the training image; and
   applying the determined color transformation to the input image, wherein the determined color transformation adjusts color values in the input image such that the input image appears as if it had been generated under white illumination.

2. The computer-implemented method of claim 1, wherein the color transformation for the input image is a nonlinear transformation.

3. The computer-implemented method of claim 2, wherein the nonlinearity of the color transformation for the input image is implemented by a kernel function that projects color values of a pixel in the input image into a larger dimensional color space, the kernel function comprising one or more nonlinear terms.

4. The computer-implemented method of claim 1, wherein the input image is an image that was generated using a combination of white balancing and one or more nonlinear color manipulation processes.

5. The computer-implemented method of claim 1, wherein the similarity metrics are computed based on a color histogram of the input image and a color histogram of each training image in the set of training images.

6. The computer-implemented method of claim 5, wherein each similarity metric represents a difference between a first feature vector and a second feature vector, the first feature vector generated by applying principal component analysis to the color histogram of the input image, and the second feature vector generated by applying principal component analysis to the color histogram of a particular training image.

7. The computer-implemented method of claim 1, wherein the color transformation for the input image involves a correction matrix computed by combining correction matrices provided for the subset of training images.

8. The computer-implemented method of claim 7, wherein the correction matrix for the input image is computed as a weighted linear combination of the correction matrices provided for the subset of training images, and wherein the weighting is based on the similarity metrics.

9. A non-transitory computer-readable medium having program code that is stored thereon, the program code executable by one or more processing devices for performing operations comprising:
   generating a set of training images based on applying different image rendering parameters to a reference image, wherein each training image in the set of training images is different from a ground truth image, wherein the ground truth image is a white balanced image for the set of training images; and
   determining a color transformation for each training image in the set of training images, wherein the color transformation for the training image minimizes a difference between the training image and the ground truth image, and wherein the color transformations determined for a subset of training images whose color characteristics are most similar to color characteristics of an input image are usable to determine a color transformation for white balancing the input image.

10. The non-transitory computer-readable medium of claim 9, wherein the program code is executable by the one or more processing devices for performing operations comprising, for each training image in the set of training images:
   determining a color histogram based on color values of pixels in the training image; and
   storing a representation of the color histogram for a subsequent comparison against a representation of a color histogram of the input image, wherein the subsequent comparison identifies the subset of training images whose color characteristics are most similar to the color characteristics of the input image.

11. The non-transitory computer-readable medium of claim 9, wherein the different image rendering parameters include different camera models, different picture styles, different white balance settings, or a combination thereof.

12. A computing system comprising:
   means for computing, for each training image in a set of training images, a similarity metric indicative of a degree of color similarity between an input image whose white balance is to be corrected and the training image;
   means for identifying, within the set of training images and based on the similarity metrics computed for the set of training images, a subset of training images that are most similar to the input image;
   means for determining a color transformation for the input image, wherein the color transformation is computed based on color transformations for white balancing the subset of training images, wherein the color transformations for white balancing the subset of training images are determined independent of the input image, and the color transformation for a particular training image is configured to minimize a difference between the training image and a ground truth image provided for the training image, the ground truth image being a white balanced version of the training image; and
   means for applying the determined color transformation to the input image, wherein the determined color transformation adjusts color values in the input image such that the input image appears as if it had been generated under white illumination.

13. The computing system of claim 12, wherein the color transformation for the input image is a nonlinear transformation.

14. The computing system of claim 13, wherein the nonlinearity of the color transformation for the input image is implemented by a kernel function that projects color values of a pixel in the input image into a larger dimensional color space, the kernel function comprising one or more nonlinear terms.

15. The computing system of claim 12, wherein the input image is an image that was generated using a combination of white balancing and one or more nonlinear color manipulation processes.

16. The computing system of claim 12, wherein the similarity metrics are computed based on a color histogram of the input image and a color histogram of each training image in the set of training images.

17. The computing system of claim 16, wherein each similarity metric represents a difference between a first feature vector and a second feature vector, the first feature vector generated by applying principal component analysis to the color histogram of the input image, and the second feature vector generated by applying principal component analysis to the color histogram of a particular training image.

18. The computing system of claim 12, wherein the color transformation for the input image involves a correction matrix computed as a weighted linear combination of correction matrices provided for the subset of training images, and wherein the weighting is based on the similarity metrics.

* * * * *